US009465486B2

(12) United States Patent
Wong et al.

(10) Patent No.: US 9,465,486 B2
(45) Date of Patent: Oct. 11, 2016

(54) PORTABLE INTERACTIVE WHITEBOARD MODULE

(71) Applicant: Hong Kong Applied Science and Technology Research Institute Company Limited, Hong Kong (HK)

(72) Inventors: Chun Yip Wong, Hong Kong (HK); Chi Kin Wong, Hong Kong (HK); Xiuling Zhu, Hong Kong (HK)

(73) Assignee: Hong Kong Applied Science and Technology Research Institute Company Limited, Shatin, New Territories, Hong Kong (CN)

( * ) Notice: Subject to any disclaimer, the term of this patent is extended or adjusted under 35 U.S.C. 154(b) by 123 days.

(21) Appl. No.: 14/329,997

(22) Filed: Jul. 14, 2014

(65) Prior Publication Data

US 2016/0011721 A1    Jan. 14, 2016

(51) Int. Cl.
*G06F 3/042* (2006.01)
*G06F 3/041* (2006.01)

(52) U.S. Cl.
CPC .......... *G06F 3/0421* (2013.01); *G06F 3/0416* (2013.01); *G06F 2203/04108* (2013.01)

(58) Field of Classification Search
CPC ..... G06F 3/042; G06F 3/0421; G06F 3/0428
USPC ....................................................... 345/175
See application file for complete search history.

(56) References Cited

U.S. PATENT DOCUMENTS

| 5,566,015 | A  | * | 10/1996 | Puzey ................. | G02B 6/3512 |
| | | | | | 398/140 |
| 6,147,681 | A  | * | 11/2000 | Chery ................ | G06F 3/03545 |
| | | | | | 345/179 |
| 6,335,723 | B1 | * | 1/2002  | Wood .................. | G06F 3/03545 |
| | | | | | 178/18.01 |
| 2004/0065139 | A1 | * | 4/2004 | Kobayakawa ....... | G01N 29/032 |
| | | | | | 73/24.06 |
| 2007/0165007 | A1 | * | 7/2007 | Morrison .............. | G06F 3/0428 |
| | | | | | 345/175 |

(Continued)

FOREIGN PATENT DOCUMENTS

CN    102073418 B    1/2013

*Primary Examiner* — Hong Zhou
(74) *Attorney, Agent, or Firm* — Ella Cheong Hong Kong; Sam T. Yip

(57) ABSTRACT

A system for determining a touch point's location within a user-definable region is provided. The system comprises plural modules. In a set-up stage, a user positions each module to define a peripheral point of the region. Exemplarily, a module comprises a means for detecting alignment between the module and another one, a means for measuring an inter-module distance, and a means for making wireless data communication. In particular, the detecting of the alignment and the measuring of the inter-module distance are configured to be performed without physically connect the two modules together. Hence, a geometric coordinate of the module relative to the other one is determinable without a need to physically connect the two modules. The system can thereby be compactly packed for traveling to give an advantage of high portability to a portable interactive whiteboard system that incorporates such system.

16 Claims, 6 Drawing Sheets

(56) References Cited

U.S. PATENT DOCUMENTS

| | | | | |
|---|---|---|---|---|
| 2009/0027694 A1* | 1/2009 | Kobayashi | G06F 3/0421 | 356/622 |
| 2011/0191690 A1* | 8/2011 | Zhang | G06F 3/00 | 715/746 |
| 2011/0291991 A1* | 12/2011 | Lin | G06F 3/0428 | 345/175 |
| 2012/0044211 A1* | 2/2012 | Hsu | G06F 3/0418 | 345/175 |
| 2012/0097854 A1* | 4/2012 | Ng | G06F 3/0416 | 250/353 |
| 2012/0154942 A1* | 6/2012 | Miyao | G06F 3/0428 | 359/855 |
| 2013/0038577 A1* | 2/2013 | Chen | G06F 3/042 | 345/175 |
| 2013/0070089 A1 | 3/2013 | Kawasaki | | |
| 2013/0135462 A1* | 5/2013 | Chen | G06F 3/042 | 348/135 |
| 2013/0141389 A1* | 6/2013 | Chou | G06F 3/0425 | 345/175 |
| 2015/0042618 A1* | 2/2015 | Lu | G06F 3/0421 | 345/175 |

* cited by examiner

PORTABLE INTERACTIVE WHITEBOARD MODULE

FIELD OF THE INVENTION

The present invention relates to a module used in building a portable interactive whiteboard having an advantage of small size for promoting portability.

BACKGROUND

An interactive whiteboard usually is a board with a size from 32 inches to 144 inches for user interaction, so the package of an interactive whiteboard is very bulky and heavy for shipment. An interactive whiteboard system comprises a whiteboard and interactive whiteboard modules. Making the interactive whiteboard system portable requires that the interactive whiteboard modules are of small size and light weight when packed during shipping. In the art, it is achievable by not limited to a large physical board. A flat surface such as an ordinary whiteboard, a wall, a glass window, a table, etc. may be selected to act as a board as well. A projector is used to project a content image on the flat surface. A touch action by an object on the flat surface is sensed by a sensing unit to find out a touch point's coordinate, which is used to update the content image so that interaction with a user is achieved. Such approach is adopted in the disclosures of US2013/0070089 and US2013/0141389. In US2013/0070089, the sensing unit has two image sensors fixed and aligned by a control device. This sensing unit is made bulky and heavy due to the presence of the control device. In US2013/0141389, the sensing unit comprises two camera devices connected by a chord for ensuring that the two camera devices are on the same plane. The presence of the chord makes the sensing unit difficult to be packed up in a small size.

There is a need for an interactive whiteboard module or a sensing unit comprising such module such that an interactive whiteboard system based on such module or unit results in a small size when packed.

SUMMARY OF THE INVENTION

Firstly, the present invention provides a system for determining a touch point's location on a user-definable region.

The system comprises plural modules. An individual module is configured to be movable by a user in order that, in a set-up stage, the user defines a peripheral point of the region. The individual module integrally comprises a means for detecting alignment between the individual module and another individual module, a means for making wireless data communication, and a means for measuring an inter-module distance between the individual module and said another individual module. In particular, the detecting of the alignment and the measuring of the inter-module distance are configured to be performed without physically connecting the two modules together. Thereby, a geometric coordinate of the individual module relative to said another individual module is determinable without a need to physically connect the individual module and said another individual module. As a result, the system is allowed to be compactly packed for traveling to give an advantage of high portability.

The individual module may further comprise a means for determining a relative orientation between the individual module and said another individual module without a need to physically connect the two modules.

In one embodiment, the alignment detecting means comprises a light emitter for generating a substantially-directional probe light beam, a light detector for detecting a probe light beam emitted from another individual module, and an indicator for providing an indication to the user when the probe light beam emitted from said another individual module is detected. Optionally, the light emitter is a laser-generating device. The indicator may be a light emitting diode or a buzzer.

By using plural modules to define a plurality of peripheral points, the region may be configured to have an arbitrary shape such as a polygon.

The invention can be used when the region is an area on a substantially-flat surface. In addition, the invention can be extended for applications when the region is a three-dimensional (3D) touch operation space.

Secondly, the present invention provides a device for forming a part of a system used for determining a touch point's location within a user-definable region where the system comprises plural modules each of which is one copy of the device. The device comprises an optical hardware unit reconfigurable to perform detecting alignment, measuring an inter-module distance, and making wireless data communication. To perform the three functions, the optical hardware unit comprises a light emitter and a light detector.

Other aspects of the present invention are disclosed as illustrated by the embodiments hereinafter.

DETAILED DESCRIPTION

An aspect of the present invention is to provide a system for determining a touch point's location on a user-definable region. The invention can be used when the region is an area on a substantially-flat surface, and can be extended for applications when the region is a 3D touch operation space. The system is usable to build a portable interactive whiteboard system.

The system is realized by multiple modules for defining peripheral points of the region. The present invention is developed based on the inventors' observation that if the modules are physically connected, it is not possible to reduce the size of the system (or the resultant portable interactive whiteboard system) when packed for traveling. Therefore, the modules used for the system disclosed herein are not physically connected. The present invention provides a module having such property.

Figure 1:
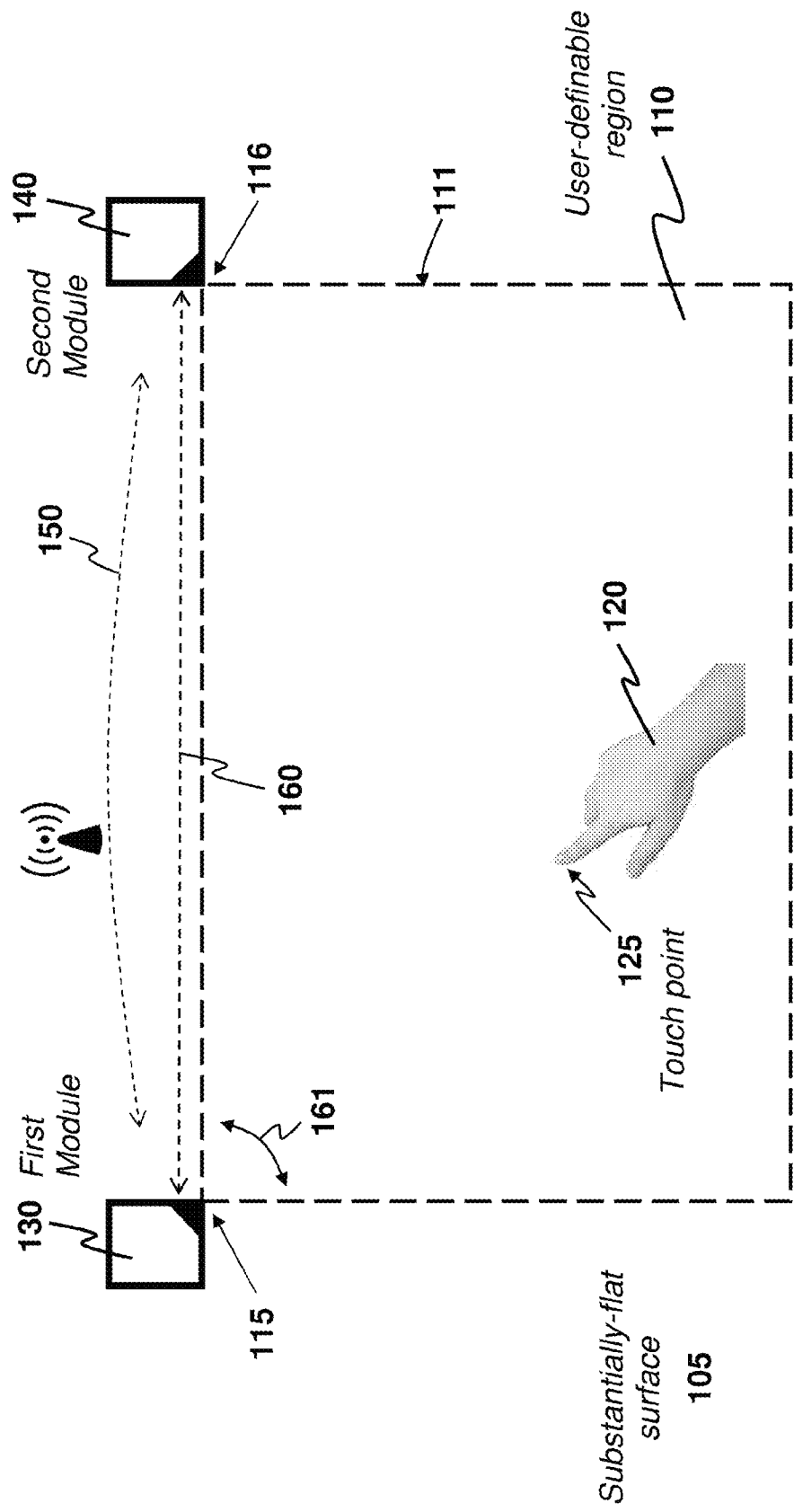
FIG. 1 exemplarily depicts a system for determining a touch point's location on a user-definable region of a substantially-flat surface, where two physically-unconnected modules are used to define the region and to perform the touch-point location determination.

FIG. 1 exemplarily depicts a touch-point location determining system in which two physically-unconnected modules are used. Consider that a user is desired to define a user-definable region 110 on a substantially-flat surface 105. It is also desired that a coordinate of a touch point 125 created by an object 120 pressing on the region 110 is determinable by the system. Although the object 120 shown in FIG. 1 is a hand, the object 120 may also be any pointing device, such as a pencil and an infrared (IR) pen, the latter being able to emit IR radiation for assisting the system to locate the touch point 125.

The system comprises a first module 130 and a second module 140, both configured to be movable on the surface 105 so that the user is able to position the two modules 130, 140 on any two locations on the surface 105. In addition, the two modules 130, 140 are communicable via a non-contact communication link 150. In a set-up stage, the user defines a boundary 111 of the region 110 by selecting a first peripheral point 115 and a second peripheral point 116 of the region 110 and by respectively positioning the first module 130 and the second module 140 thereon. After the two peripheral points 115, 116 are set, the boundary 111 is determined by a sensing range of each of the modules 130, 140. After the region 110 is defined, an inter-module distance 160, i.e. a distance between the two modules 130, 140, is measured. A geometric coordinate of the first module 130 relative to the second module 140 is thereby determinable. Based on this geometric coordinate as a reference, the location of the touch point 125 can be obtained by a variety of methods. Such methods can be found in, for example, U.S. patent application Ser. No. 13/929,756, filed 27 Jun. 2013, and China Patent No. 102,073,418, issued 23 Jan. 2010, the disclosure of each of which is incorporated by reference herein in its entirety.

Optionally, a relative orientation between the first module 130 and the second module 140 may be determined as well. The relative orientation specifies a direction that the first module 130 points towards the second module 140. The relative orientation may be represented in general by a vector embodying the aforesaid direction, or more practically by an angle 161 as shown in FIG. 1. Although the angle 161 is not necessary in determining the geometric coordinate of the first module 130 relative to the second module 140 in the example of FIG. 2, it is necessary in some situations. For instance, when the user-definable region has an arbitrary polygonal shape as in the examples of FIG. 3, a value of the relative orientation is required in determining a geometric coordinate of one module relative to another module.

Figure 2:
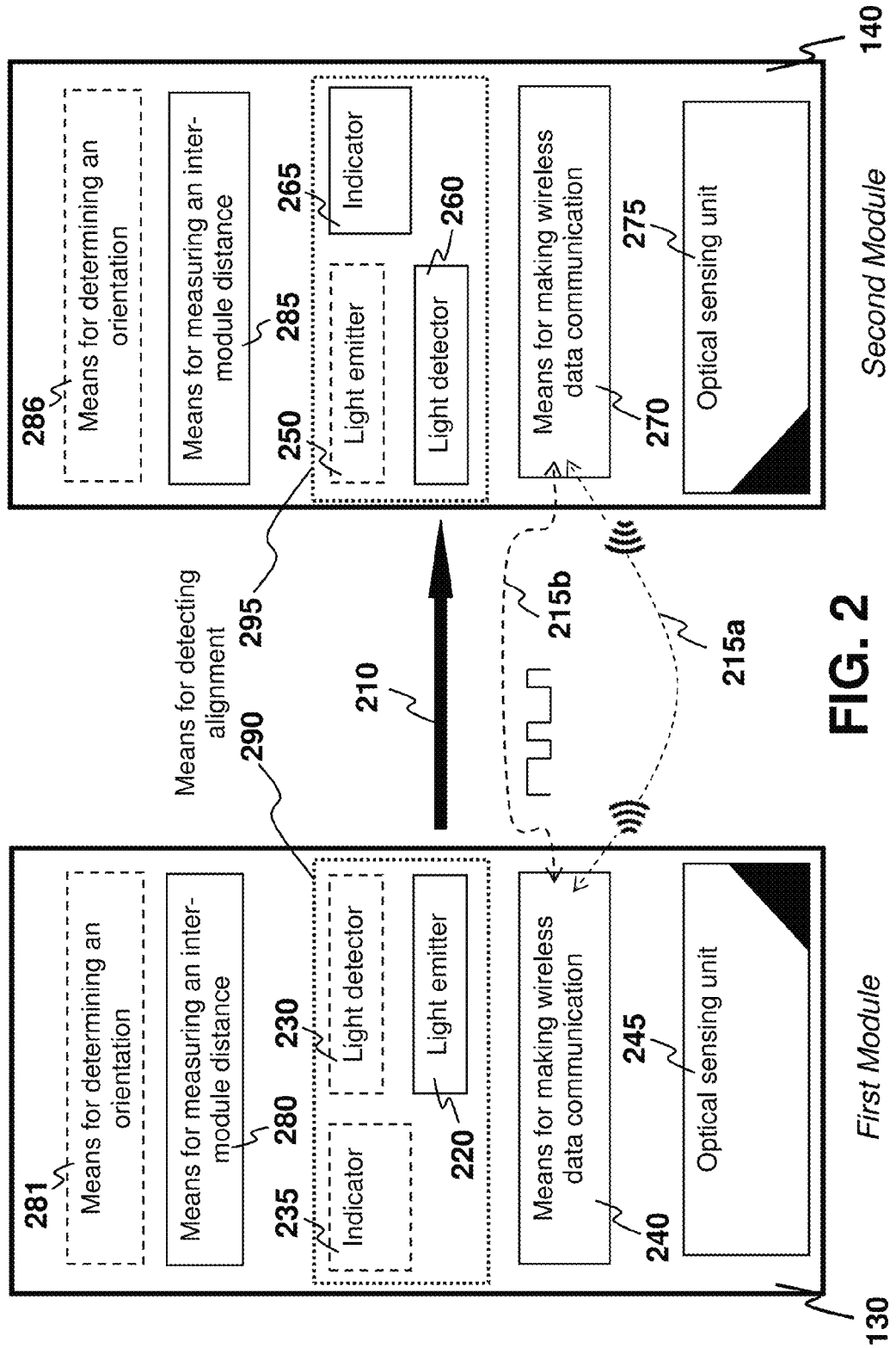
FIG. 2 exemplarily depicts a schematic diagram of the two modules used in the system of FIG. 1.

After the user positions the two modules 130, 140 to define the two peripheral points 115, 116, the two modules 130, 140 are required to mutually point to each others for facilitating measurement of the inter-module distance 160 to thereby determine the relative geometric coordinate of the first module 130. Setting the two modules 130, 140 to point to each others is herein termed "alignment." FIG. 2 is a schematic diagram of the two modules 130, 140 for illustrating an alignment procedure between these two modules 130, 140. The first module 130 and the second module 140 comprise means for detecting alignment 290, 295, respectively. The alignment detecting means 290 of the first module 130 comprises a light emitter 220 for generating a substantially-directional probe light beam 210 and sending the probe light beam 210 to the second module 140. The light emitter 220 may be a laser-generating device so that the probe light beam 210 is a laser beam advantageously used in performing the alignment. The alignment detecting means 295 of the second module 140 comprises a light detector 260 for detecting the probe light beam 210 to thereby detect alignment of the two modules 130, 140. To inform the user that the alignment is achieved, the alignment detecting means 295 further comprises an indicator 265 for providing an indication to the user when the probe light beam 210 is detected. The indicator 265 may be a light emitting diode (LED) for providing a visual indication, or a buzzer for giving an audio indication to the user. In addition, the first module 130 and the second module 140 are installed with means for making wireless data communication 240, 270, respectively. It follows that both the modules 130, 140 are wirelessly communicable with each to initiate measurement of the inter-module distance 160.

In addition, the first module 130 and the second module 140 comprise means 280, 285 for measuring an inter-module distance, respectively. The two measuring means 280, 285 are configured to measure the inter-module distance 160 according to a time of flight (TOF) of the probe light beam 210 emitted at the first module 130 and received at the light detector 260 of the second module 140. This non-contact measurement is an advantage of the disclosed system in that the geometric coordinate of the first module 130 relative to the second module 140 is determinable without a need to physically connect the two modules 130, 140. In one embodiment, the TOF is measured according to a phase difference between the probe light beam 210 emitted and the one received.

Since both the detecting of the alignment and the measuring of the inter-module distance 160 do not require the two modules 130, 140 to be physically connected, it follows that the system is allowed to be compactly packed for traveling to offer an advantage of high portability. From another perspective, it is noticed that, as an illustrative example, the first module 130 has the inter-module distance measuring means 280, the alignment detecting means 290 and the wireless data communication making means 240 implemented into one integrated device. The property of integrating these means 280, 290, 240 into one integrated device is contributory to the aforementioned advantage of the system disclosed herein.

The first module 130 further comprises an optical sensing unit 245 for detecting light reflected or emitted from the touch point 125 such that information obtained from the detected light is usable in determining the location of the touch point 125. Similarly, the second module 140 further comprises an optical sensing unit 275.

In case an infrared pen for emitting IR radiation is used as the object 120, each of the two optical sensing units 280, 285 may comprise an infrared detector.

The first module 130 and the second module 140 may include, respectively, means 281, 286 for determining a relative orientation between the first module 130 and the second module 140, wherein the two orientation determining means 281, 286 do not require the two modules 130, 140 to be in physical contact in determining the relative orientation. For example, each of the orientation determining means 281, 286 may be implemented with an optical scanning method for orientation determination.

It is possible that the alignment detecting means 290 of the first module 130 further comprises a light detector 230 and a visual indicator 235, and that the alignment assisting means 295 of the second module 140 further includes a light emitter 250. It follows that all the modules in the disclosed system become substantially similar. In one option, one device (or one reference module) is used for forming a part of the disclosed system with each of the modules therein being a copy of such one device.

In a first option, each of the wireless data communication making means 240, 270 is a radio transceiver such that the first module 130 and the second module 140 are communicated through a radio channel 215a. The radio transceiver may employ an existing wireless data transfer protocol such as WiFi and Bluetooth. In a second option, each of the wireless data communication making means 240, 270 is an optical-communication transceiver configured to transfer data based on optical data transmission via an optical channel 215b. The optical data transmission may be based on modulating the probe light beam 210.

Figure 3:
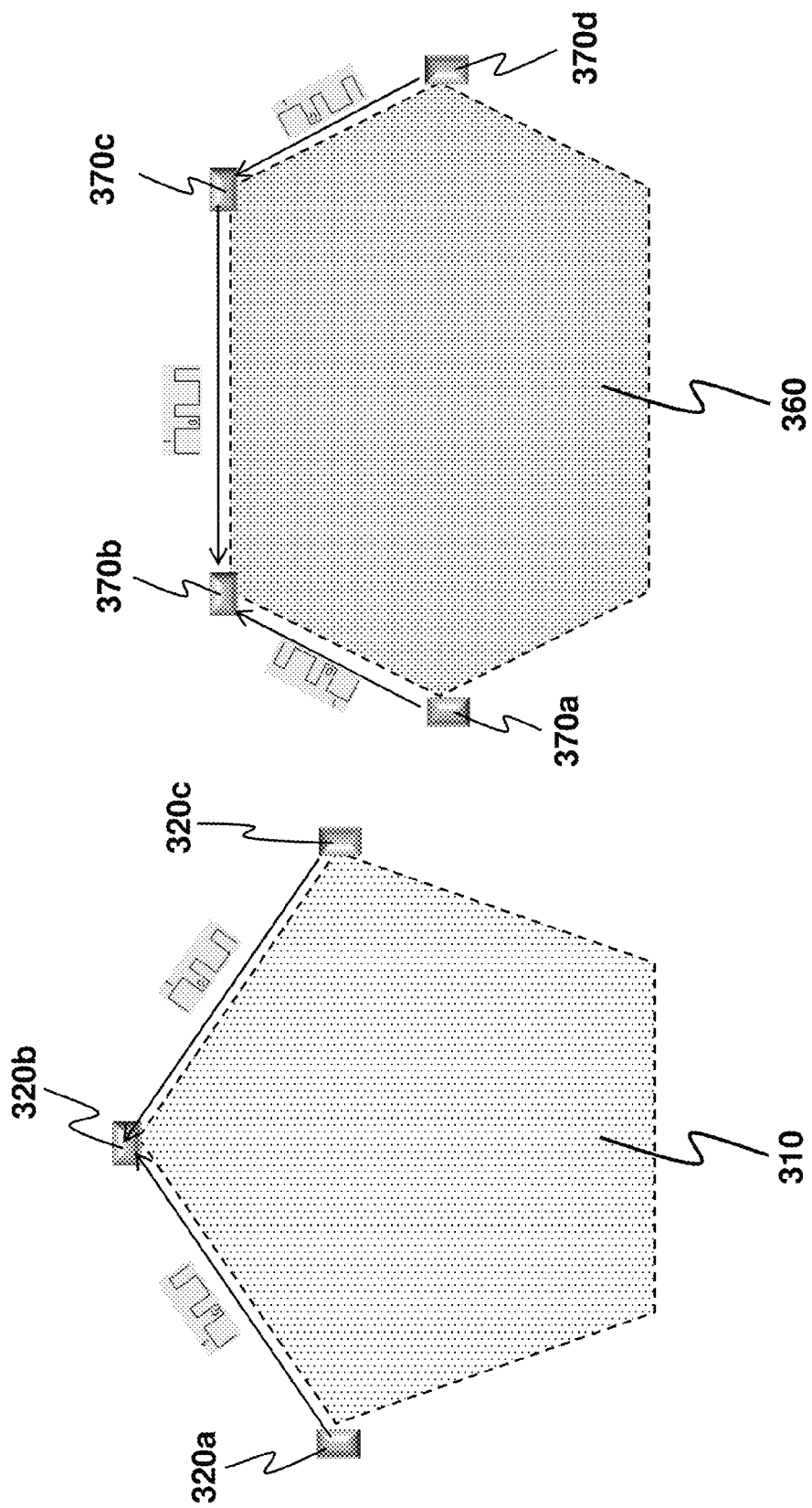
FIG. 3 depicts two example cases of using multiple modules for realizing user-definable regions having arbitrary shapes.

FIG. 3 shows two examples of forming a user-definable region with an arbitrary shape by using one reference module for realizing all the modules in a system. By using three modules 320a-c, a region 310 of a shape of a pentagon is obtained in one example. In another example, another region 360 having a hexagonal shape is obtained by using four modules 370a-d.

Figure 4:
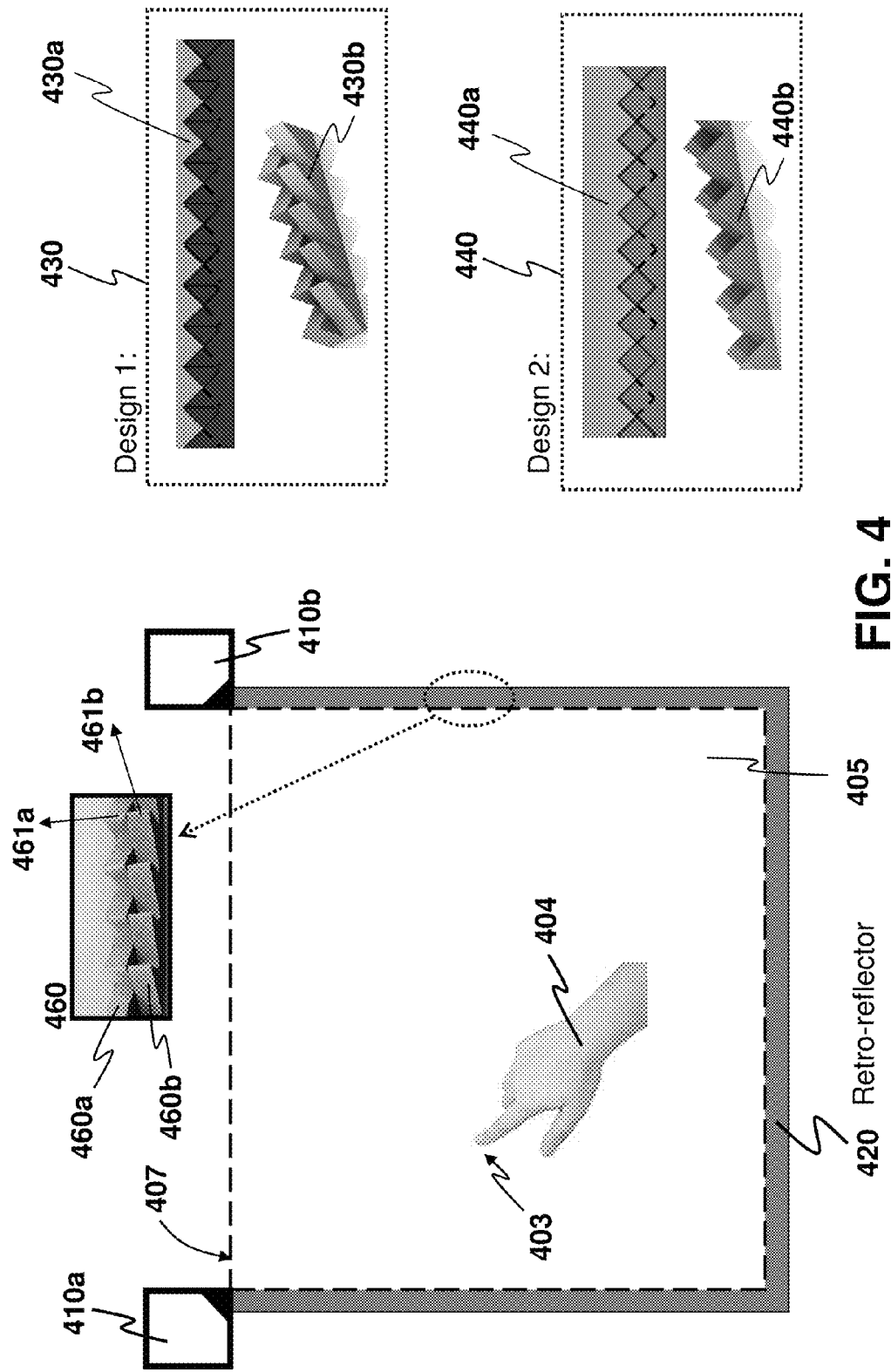
FIG. 4 depicts using retro-reflectors for assisting touch-point location determination by increasing an intensity of light reflected by the retro-reflector, and shows two designs of retro-reflectors according to one embodiment.

As disclosed in China Patent No. 102,073,418, it is possible to increase an intensity of light reflected from retro-reflector and received by an optical sensing unit of a module by using retro-reflectors. FIG. 4 depicts using retro-reflectors for assisting touch-point location determination, and shows two designs of retro-reflectors according to one embodiment. A user-definable region 405 has a boundary or perimeter 407. Two modules 410a, 410b are located at two peripheral points of the region 405. A touch point 403 is required to be located by irradiating IR light from the two modules 410a, 410b. It follows that optical sensing units in each of the modules 410a, 410b comprises an infrared source for generating IR radiation and an infrared sensor for detecting received infrared radiation. From FIG. 4, one or more retro-reflectors 420 are installed and positioned along at least part of the region 405's perimeter 407 for reflecting the IR radiation produced by the infrared light source. FIG. 4 also shows one embodiment of a retro-reflector 460. The retro-reflector 460 is a tape having a first rail 460a and a second rail 460b attached together in parallel, where the first rail 460a comprises a first plurality of triangles collectively having a first pointing orientation 461a, and the second rail 460b comprises a second plurality of triangles collectively having a second pointing orientation 461b. Two designs 430, 440 of the retro-reflector 460 are shown. The first pointing orientation and the second pointing orientation may be different (as in the retro-reflector design 430 with a side view 430a and a perspective view 430b) or substantially similar (as in the retro-reflector design 440 with a side view 440a and a perspective view 440b).

Based on the embodiments disclosed herein, a portable interactive whiteboard system configured to be installed on a substantially-flat surface and having a reconfigurable user-definable region for interaction with a touch point can be developed. The whiteboard system comprises an embodiment of the system disclosed above, a projector for projecting a display-content image on the surface, and a computing unit for processing the touch point's location so as to update the display-content image.

As mentioned above, the invention can be extended to a 3D case such that the user-definable region is a 3D touch operation space.

Figure 5:
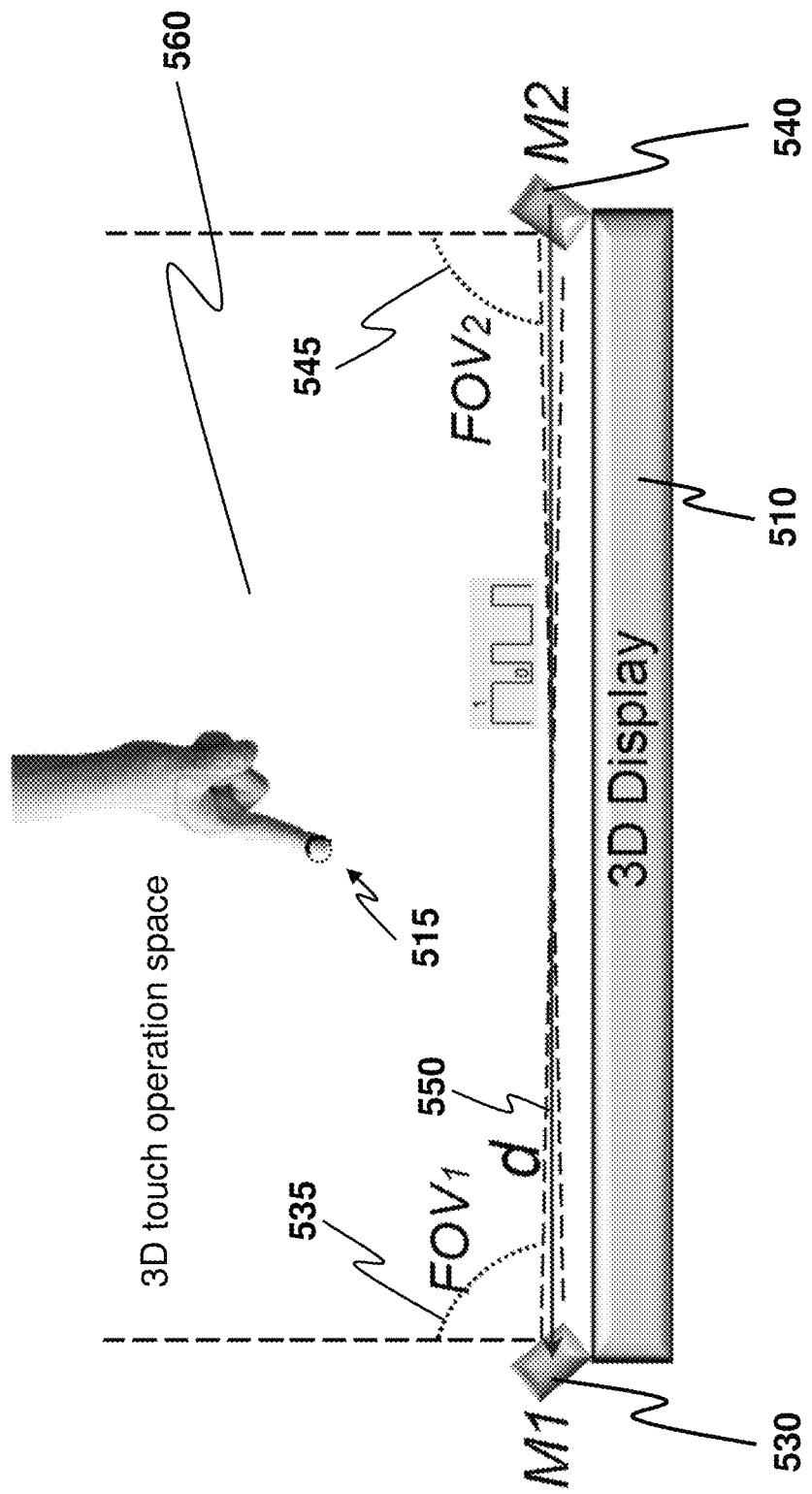
FIG. 5 depicts, according to one embodiment, a system for determining a touch point's 3D location in a 3D touch operation space.

FIG. 5 is an example illustrating a system for determining a touch point's 3D location in a 3D touch operation space. It is desired to define a 3D touch operation space 560 positioned on a 3D display 510 in order to obtain a 3D coordinate of a touch point 515 when it is inside the 3D touch operation space 560. To define the 3D touch operation space 560 as shown in FIG. 5, a first module 530 and a second module 540 are positioned on the 3D display 510 for defining two peripheral points of the 3D touch operation space 560. The first module 530 and the second module 540 have a first field of view (FOV) 535 and a second FOV 545, respectively. The two FOVs 535, 545 may be defined by, for example, optical sensing devices such as cameras installed in the two modules 530, 540. The 3D touch operation space 560's boundary is then defined by the first FOV 535, the second FOV 545, and an inter-module distance 550 between the first module 530 and the second module 540.

Figure 6:
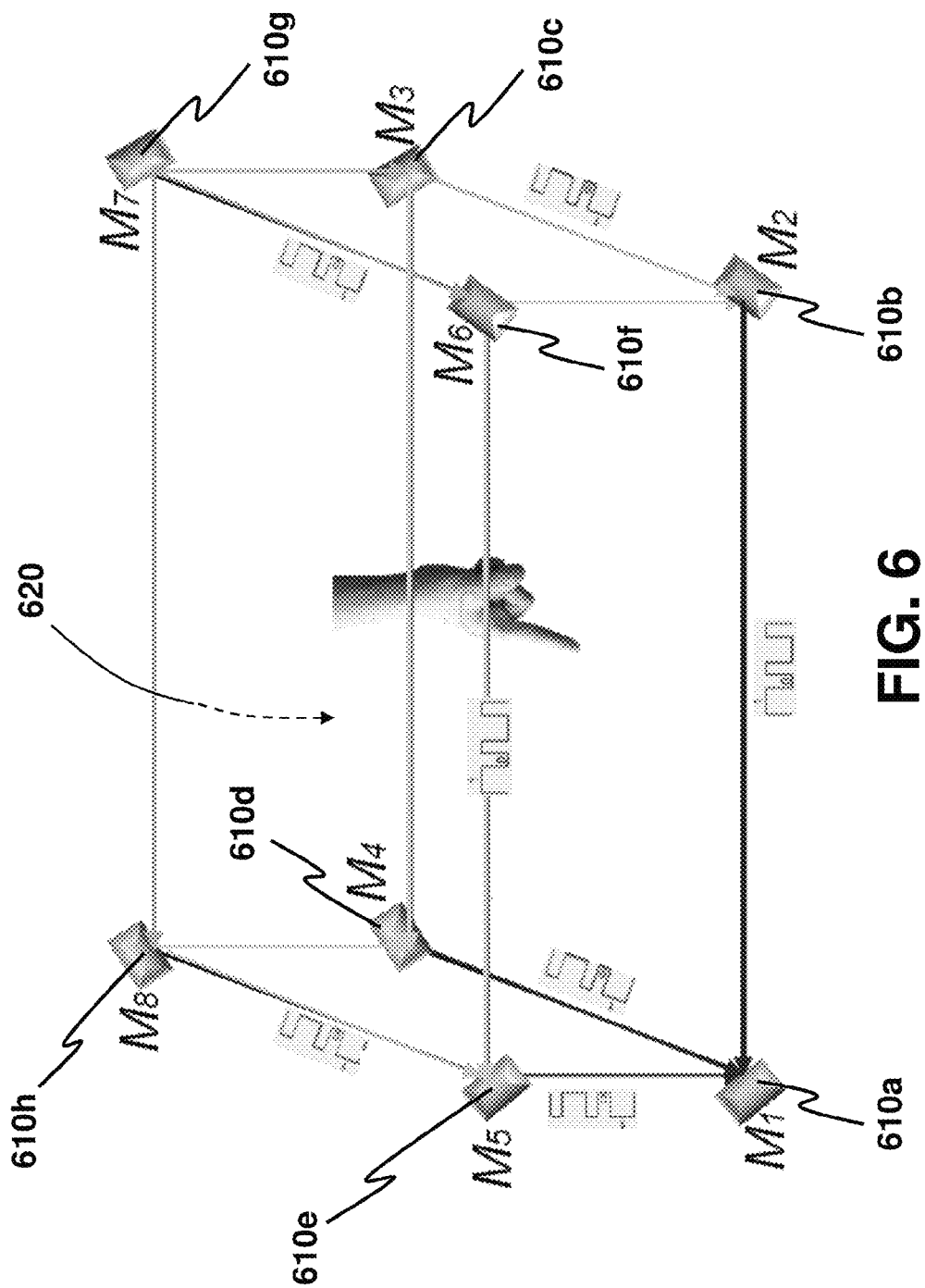
FIG. 6 depicts, according to one embodiment, an arrangement of multiple modules for defining a 3D touch operation space.

FIG. 6 shows another example of defining a 3D touch operation space. A 3D touch operation space 620 is defined by a plurality of modules 610a-h. Each of the modules 610a-h is configured to be three-dimensionally movable. The modules 610a-h are three-dimensionally positioned such that the 3D touch operation space is an inner space enclosed by all the modules 610a-h. An orientation between any two of the modules 610a-h may be determined by a scanning mechanism or other method. The obtained orientation information and the information on inter-module distances enables a 3D geometric coordinate of any one of the modules 610a-h to be determinable.

Refer to FIG. 1 again. As elaborated above, it is possible that in the first module 130 as an example, the alignment detecting means 290, the inter-module distance measuring means 280 and the wireless data communication making means 240 are realizable by an optical means involving the light detector 230 and the light emitter 220. Another aspect of the present invention is to provide a device having such optical means.

The device is for forming a part of a system that is used for determining a touch point's location within a user-definable region where the system comprises plural modules each of which is one copy of the device. The device comprises an optical hardware unit, which comprises a light emitter for generating a substantially-directional probe light beam, and a light detector for detecting a received probe light beam. In particular, the optical hardware unit is reconfigurable so as to perform: detecting alignment between the device and another substantially-similar device; measuring an inter-module distance between the device and said another substantially-similar device; and making wireless data communication.

To enable the optical hardware unit to perform the aforementioned three functions, the optical hardware unit is configured to have the following three properties when plural copies of the devices are realized as the modules. A first module and a second module mentioned in the three properties are any two modules selected from the modules.

The first module sends out the probe light beam to the second module, and the second module detects alignment of the first and the second modules by detecting a presence of the probe light beam sent out from the first module and received at the light detector of the second module.

The inter-module distance is measured according to a time of flight of the probe light beam emitted at the first module and received at the light detector of the second module.

The wireless data communication is made based on optical data transmission via modulating the probe light beam.

In one option, the time of flight is measured according to a phase difference between the probe light beam emitted at the first module and the one received at the light detector of the second module.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A system for determining a touch point's location within a user-definable region, the system comprising plural modules configured to be movable for a user to define plural peripheral points of the region, an individual module comprising:

an optical hardware unit comprising a light emitter for generating a substantially-directional probe light beam, and a light detector for detecting a received probe light beam, the optical hardware unit being configured for measuring an inter-module distance between the individual module and another individual module, determining a relative orientation between the individual module and said another individual module, and wirelessly communicating data with said another individual module, wherein the relative orientation is a direction that the individual module points towards said another individual module, whereby the inter-module distance, the relative orientation and the wirelessly-communicated data are usable in determining a geometric coordinate of the individual module relative to said another individual module;

wherein the measuring of the inter-module distance and the determining of the relative orientation are configured to be performed without a need to physically connect the individual module and said another individual module together, so that the geometric coordinate of each individual module is determinable without a need to have a physical connection between any two of the modules.

2. The system of claim 1, wherein:
the optical hardware unit is further configured for detecting alignment between the individual module and said another individual module, the detecting of the alignment being configured to be performed without a need to physically connect the individual module and said another individual module together.

3. The system of claim 2, wherein:
the generating of the substantially-directional probe light beam by the light emitter of a first module enables the first module to send out the probe light beam to a second module in detecting alignment between the first module and the second module where the first and the second modules are selected from the modules;
the detecting of the probe light beam emitted from said first module by the light detector of the second module enables the second module to detect the alignment of the first and the second modules by detecting a presence of the probe light beam sent out from the first module and received at the light detector of the second module; and
the optical hardware unit further comprises an indicator for providing an indication to the user when the probe light beam emitted from said first module is detected, thereby informing the user that the alignment of the first and the second modules is achieved.

4. The system of claim 3, wherein for each of the first and the second modules, the optical hardware unit is configured to measure the inter-module distance according to a time of flight of the probe light beam emitted at the first module and received at the light detector of the second module.

5. The system of claim 4, wherein the time of flight is measured according to a phase difference between the probe light beam emitted at the first module and the one received at the light detector of the second module.

6. The system of claim 3, wherein the indicator is a light emitting diode.

7. The system of claim 1, wherein the individual module further comprises:
an optical sensing unit for detecting light that is received such that information obtained from the detected light is usable in the determining of the touch point's location.

8. The system of claim 7, further comprising an infrared pen configured to emit infrared radiation, wherein the optical sensing unit comprises an infrared sensor.

9. The system of claim 7, wherein:
the optical sensing unit comprises an infrared source for generating infrared radiation, and an infrared sensor for detecting received infrared radiation; and
the system further comprises one or more retro-reflectors for reflecting the infrared radiation produced by the infrared light source, the retro-reflector being positioned along at least part of the region's perimeter.

10. The system of claim 9, wherein at least one of the one or more retro-reflectors is a tape having a first rail and a second rail attached together in parallel, the first rail comprising a first plurality of triangles, the second rail comprising a second plurality of triangles.

11. The system of claim 10, wherein the first plurality of triangles has a first pointing orientation and the second plurality of triangles has a second pointing orientation, the first pointing orientation and the second pointing orientation being different or substantially similar.

12. A portable interactive whiteboard system configured to be installed on a substantially-flat surface, an area on the surface for interaction with a touch point being reconfigurable and being designated as a user-definable region on the surface, the portable interactive whiteboard system comprising:
the system for determining the touch point's location within the user-definable region as set forth in claim 7;
a projector for projecting a display-content image on the surface; and
a computing unit for processing the touch point's location so as to update the display-content image.

13. The system of claim 1, wherein the light emitter is a laser-generating device.

14. The system of claim 1, wherein the user-definable region is a two-dimensional region on a substantially-flat surface so that the modules are configured to be movable over the surface, and wherein the region has an arbitrary shape.

15. The system of claim 1, wherein the user-definable region is a three-dimensional (3D) touch operation space.

16. The system of claim 15, wherein:
each of the modules is configured to be three-dimensionally movable; and
the modules are three-dimensionally positioned such that the 3D touch operation space is an inner space enclosed by all the modules.

* * * * *